United States Patent [19]
Von Alpen

[11] Patent Number: 5,496,643
[45] Date of Patent: Mar. 5, 1996

[54] BULLETPROOF GLASS PANE OF AUTOMOBILES

[75] Inventor: Ulrich Von Alpen, Aachen, Germany

[73] Assignee: Saint-Gobain Vitrage, Courbevoie, France

[21] Appl. No.: 279,202

[22] Filed: Jul. 22, 1994

[30] Foreign Application Priority Data

Jul. 22, 1993 [DE] Germany .............................. 9310957 U

[51] Int. Cl.$^6$ .............................. E06B 3/24; B32B 15/00
[52] U.S. Cl. ............................ 428/432; 428/34; 428/410; 428/415; 428/417; 428/702; 428/908.8; 428/913; 52/786.12
[58] Field of Search .............................. 296/84.1; 428/34, 428/192, 410, 415, 417, 426, 430, 432, 701, 7.2, 908.8, 913; 52/788, 790; 2/2.5

[56] References Cited

U.S. PATENT DOCUMENTS

| | | | |
|---|---|---|---|
| 3,630,814 | 12/1971 | Arnold | 428/34 |
| 4,308,316 | 12/1981 | Gordon | 428/336 |
| 4,312,908 | 1/1982 | Molari | 428/34 |
| 4,368,226 | 1/1983 | Mucaria | 428/34 |
| 5,059,467 | 10/1991 | Berkovitz | 428/137 |
| 5,306,547 | 4/1994 | Hood et al. | 428/213 |
| 5,368,904 | 11/1994 | Stephinson | 428/34 |

*Primary Examiner*—Donald J. Loney
*Attorney, Agent, or Firm*—Oblon, Spivak, McClelland, Maier, & Neustadt

[57] ABSTRACT

The invention provides a bombardment-inhibiting bulletproof glass pane or automobiles, composed of a plurality of silicate glass panes with intermediate layers of thermoplastics polymer disposed between them. On the interior surface of the bulletproof glass pane, a sheet or plate of impact-resistant plastics material is mounted by means of a thermoplastics adhesive film such that, in the installed state, this sheet faces towards the passenger compartment. On the exterior surface of the bulletproof glass pane is a scratch-resistant coating.

10 Claims, 2 Drawing Sheets

BULLETPROOF GLASS PANE OF AUTOMOBILES

BACKGROUND OF THE INVENTION

1. Field of the invention

The invention relates to a bombardment-inhibiting bulletproof glass pane or automobiles, composed of a plurality of silicate glass panes with intermediate layers of thermoplastics polymer disposed between them. On the interior surface of the bulletproof glass pane, a sheet or plate of impact-resistant plastics material is mounted by means of a thermoplastics adhesive film such that, in the installed state, this sheet faces towards the passenger compartment. On the exterior surface of the bulletproof glass pane is a scratch-resistant coating.

2. Description of the Related Art

Bombardment-inhibiting bulletproof glass panes are conventionally known. For example, DE 34 21 571 describes a bulletproof glass pane consisting of three silicate glass sheets each 6 mm thick, which are connected together by 0.76 mm thick polyvinyl butyral sheets. On the surface towards the passenger compartment, a plate of polycarbonate is bonded by a thermoplastics polyurethane layer to the bulletproof glass pane. On the exterior surface, the bulletproof glass pane is provided with a soft elastic polyurethane film having a self-healing characteristic.

Providing a plate of impact-resistant plastics, such as polycarbonate, on the rear face of the bulletproof glass pane, reliably prevents splinters from flying on this face in case of bombardment. On the other hand, with glazing of this type, problems arise with exposure to solar radiation due to the different thermal expansions of the rear polycarbonate plate and the silicate glass sheet. The shear stresses that arise in the adhesive film between the polycarbonate plate and the glass surface can, at high temperature, lead to deformations or even to breaking-away of the polycarbonate plate. It is therefore desirable to provide a bulletproof glass pane in which the risk of a deformation or breaking away of the polycarbonate plate due to exposure to solar radiation is prevented or at least greatly reduced.

SUMMARY OF THE INVENTION

Accordingly, one object of the present invention is to provide a bombardment-inhibiting bulletproof glass pane in which the risk of a deformation or breaking away of the polycarbonate plate due to the exposure to solar radiation is prevented or at least greatly reduced.

The bulletproof glass pane according to this invention comprises a silicate glass sheet placed outwardly of a sheet or plate of impact-resistant plastics which further is provided with a thermal radiation-reflecting coating.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts. In the drawings, the figures are each partial sectional views.

DESCRIPTION OF THE PREFERRED EMBODIMENTS

Figure 1:
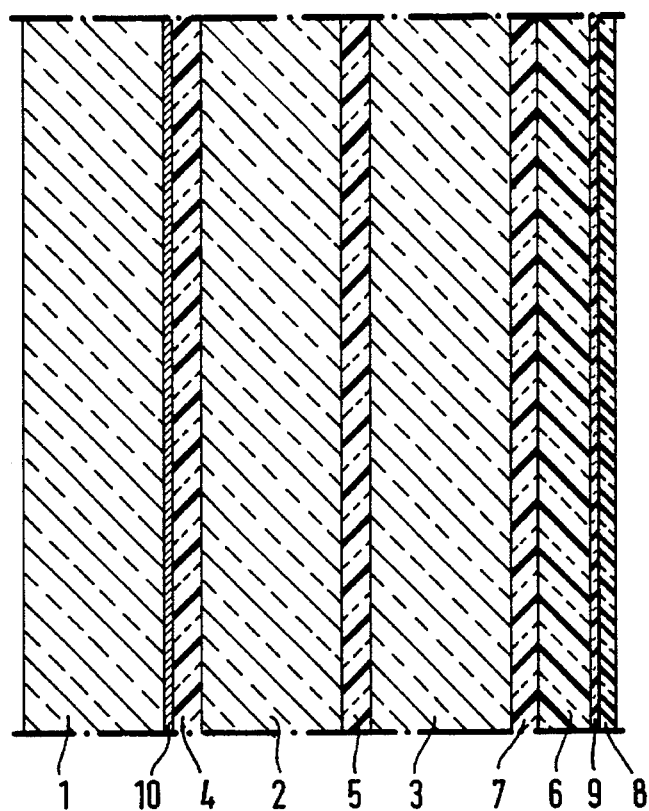
FIG. 1 is a first embodiment of a bulletproof glass pane according to the present invention.

In a first embodiment of the bulletproof glass pane according to the present invention, a thermal radiation-reflecting film is disposed on the outermost glass sheet of a bulletproof glass pane.

Suitably the bulletproof glass pane is composed of a plurality of silicate glass sheets of 5–15 mm, preferably 7–8 mm, thick. The silicate glass sheets are each bonded together with an intermediate layer of a thermoplastic adhesive such as thermoplastic polyurethane.

On outer surface of the silicate glass sheet of the glass pane which in the installed state faces towards the passenger compartment, an approximately 2–10, preferably 2–5 mm thick scratch resistant layer is disposed. Preferably the scratch resistant layer is polycarbonate coated with soft-elastic polyurethane. This scratch resistant layer is bonded to the silicate glass sheet by a 1.5 to 2.5 mm thick intermediate layer of a thermoplastic adhesive such as thermoplastic polyurethane or polyvinyl butyral.

Suitable thermal radiation-reflecting films in accordance with the present invention are most effective when disposed directly on the outer face of the bulletproof glass pane. For this purpose, a thermal radiation-reflecting film which is very wear-resistant and resistant to atmospheric influences is used. Preferred films include 50–150 nm thick laminated structures of silver, which have particularly favorable transmission and reflection properties. Such films are widely used for heat protective panes. For example, a laminated composed of ZnO (35 nm)—Ag (10 nm)—ZnO (35 nm) may be used. On this multiple film there is favorably applied a further, approximately 20 nm thick, film of tantalum oxide, which improves the bond of the thermal radiation-reflecting film to the thermoplastics intermediate film.

The thermal radiation-reflecting films of the present invention can be applied to the bulletproof glass pane by conventional methods, preferably by the method of magnetic field-assisted, reactive cathodic sputtering.

Preferably the thermal radiation-reflecting films of the present invention are protected. Such films are preferably protected by disposing them on the surface of the outermost glass sheet of the bulletproof glass which lies against the thermoplastic intermediate film.

By providing a thermal radiation-reflecting coating, preferably onto the inwardly facing side of the outermost glass sheet, the thermal radiation incident from outside is for the greater part reflected, so that the bulletproof glass pane becomes heated to a substantially lesser degree or does not reach its final temperature until after a substantially longer period. Consequently, the shear stresses that build up in the boundary layer between the polycarbonate plate and the glass sheet are much less, or they do not reach their maximum values until much later. The shear stresses that arise in the adhesive film between the polycarbonate plate and the glass sheet can then be more effectively reduced by plastic deformation of the adhesive film, that is to say by flow phenomena in this film, because a longer period is available for this purpose. The result is that perturbing deformations of the polycarbonate sheet or breaking-away are considerably reduced or entirely prevented by the smaller and slower heating-up.

In a second embodiment of the bulletproof glass pane according to the present invention, a thermal radiation-reflecting film is disposed on a second glass sheet or pane, which is arranged with an air gap from the outwardly facing surface of the bulletproof glass pane and is connected to the latter by a spacer frame.

This embodiment provides the additional advantage that, for the second glass pane, a glass pane of standard construction can be used such as a monolithic glass pane or a laminated glass pane. This allows the glass pane to be installed, as is, flush with the outer contour of the automobile. In this way, a vehicle is provided with a bulletproof glass pane which resembles in its outer appearance a standard vehicle. That is, the vehicle is harder to recognize as a bulletproof vehicle.

Bulletproof glass panes of the present invention are suitable for all the windows of an automobile, that is both for permanently installed window panes such as the windscreen (windshield) and rear window pane, and also for permanently installed side and door window panes that can be raised and lowered.

The installation of the bulletproof glass pane is performed in the known and usual manner, and the details with regard to this are therefore not depicted in the drawings. Further advantages and details of the invention will be apparent from the sub-claims and from the following description of various examples of embodiment, given with reference to the drawings.

The bulletproof glass pane illustrated in FIG. 1 comprises three silicate glass sheets 1, 2 and 3, each 8 mm thick, which are bonded to one another by the two intermediate films 4 and 5, each 0.76 mm thick. On the silicate glass sheet 3, which in the installed state of the bulletproof pane is towards the inside, that is towards the passenger compartment, an approximately 3 mm thick polycarbonate plate 6 is disposed. This polycarbonate plate 6 is bonded to the glass sheet 3 by an adhesive layer 7 of thermoplastic polyurethane, from 1.5 to 2.5 mm thick. The polycarbonate plate 6 is provided, on its surface towards the passenger compartment, with a sheet 8 of soft-elastic polyurethane, the bonding to the polycarbonate plate 6 being obtained by a thin adhesive film 9 of a suitable thermoplastic polyurethane.

The glass sheet 1 oriented towards the outside is provided, on the side bearing against the intermediate film 4, with the thermal radiation-reflecting film 10. This film 10 is preferably applied by the method of magnetic field-assisted, reactive cathodic sputtering and is multilayer-film comprising a thin silver film as the actual functional film. This multiple film has, for example, the construction glass—ZnO (35 nm)—Ag (10 nm)—ZnO (35 nm). On this multiple film there is favorably applied a further, approximately 20 nm thick, film of tantalum oxide, which improves the bond of the multilayer film to the thermoplastics intermediate film 4, which usually is of polyvinyl butyral.

Figure 2:
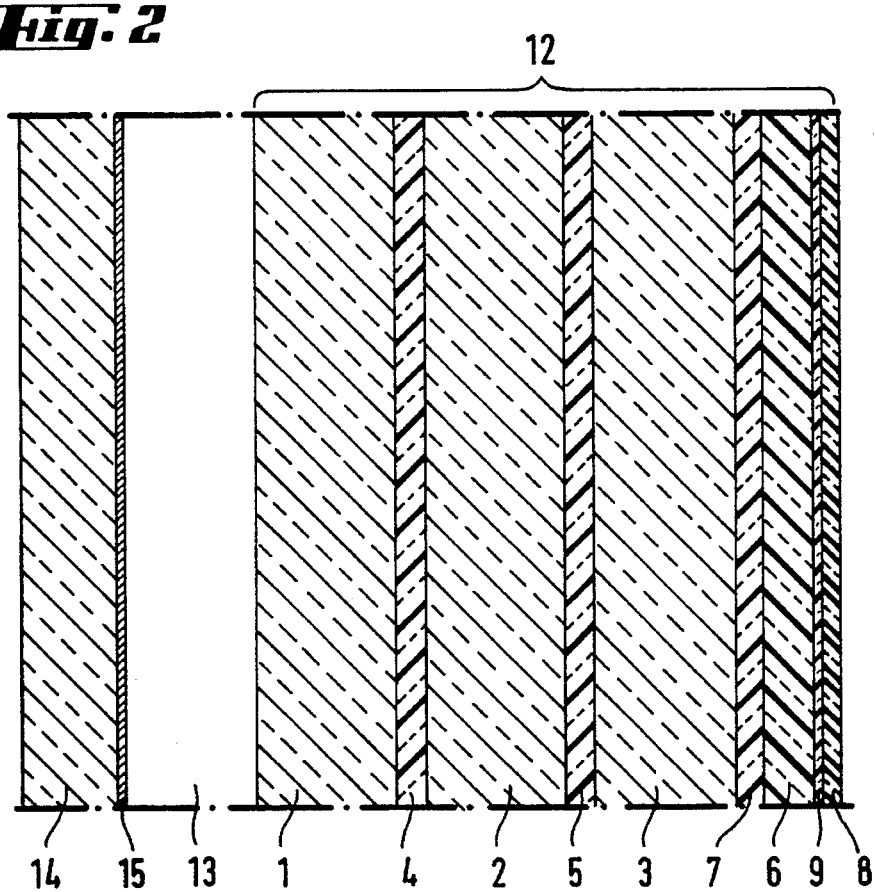
FIG. 2 is a second embodiment of a bulletproof glass pane according to the present invention.

The bulletproof glass pane illustrated in FIG. 2 is of two-leaf construction, the leaf 12 towards the vehicle interior corresponding, with the exception of the thermal radiation-reflecting film, to the construction of the bulletproof glass pane described in relation to FIG. 1. The individual layers of this leaf 12 are, therefore, given the same reference as the corresponding layers in FIG. 1. In front of this leaf 12 of the multilayer laminated glass, there is disposed, after an air gap 13, a monolithic glass pane 14, for example of toughened single-sheet safety glass. This glass pane 14 is connected to the glass sheet 1 in the manner of an insulating glass pane by a spacer frame, not illustrated in the drawing, disposed along the periphery of the pane. On the fact of the glass pane 14 towards the air gap 13, the thermal radiation-reflecting film 15 is disposed, which corresponds in its construction to the film 10 in FIG. 1. This pane construction has a more favorable effect with regard to the heating-up of the polycarbonate plate 6, because the additional air layer 13 constitutes an additional insulating layer against the flow of heat.

Figure 3:
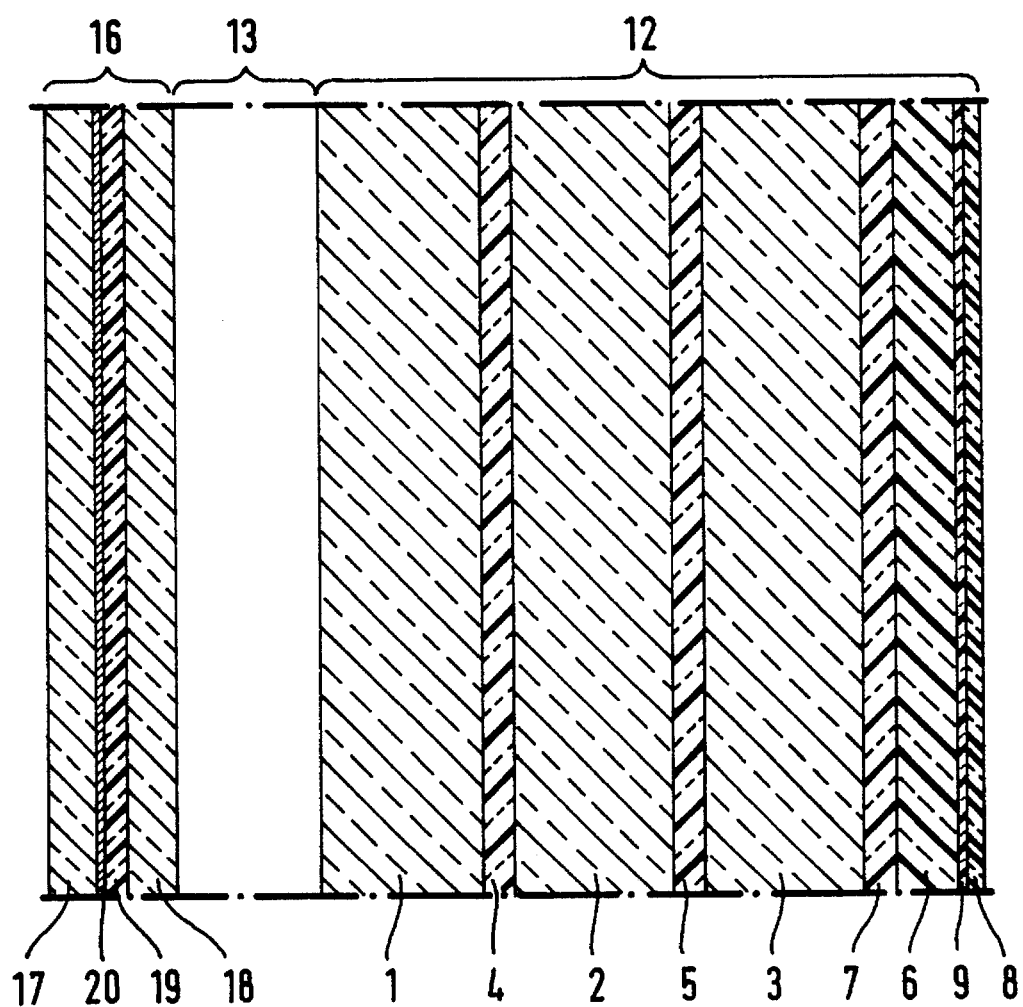
FIG. 3 is a third embodiment of a bulletproof glass pane according to the present invention.

The construction of the pane may also be varied in that the outer leaf of the bulletproof glass pane does not consist of a monolithic glass pane, but of a laminated glass pane. **Such a pane construction is shown in FIG. 3. The leaf 12, oriented towards the interior of the vehicle, once again has the same construction as the leaf 12 in the preceding example of embodiment. The laminated glass pane 16, disposed beyond the air gap 13, consists of two single glass sheets 17, 18, each approximately 3 mm thick, which are bonded together by a thermoplastic sheet 19, 0.76 mm thick. The outer single glass sheet 17 of this laminated glass pane 16 is provided, on the side bearing against the thermoplastics intermediate film 19, with the thermal radiation-reflection film 20, which has the same construction as the film 10 described in the first example of embodiment.

In all the cases illustrated, the glass sheet equipped with the thermal radiation-reflecting film is connected to another glass sheet either over its entire area or at the edge by a spacer frame. In all three cases, it must be ensured that the thermal radiation-reflecting coating is removed, in the edge region of the glass sheet, over a width of a few millimeters, or the film is prevented from being formed, in this edge zone, by suitable means during the coating of the glass sheet. In this way a mutual bonding, which is especially permanent and durable, is obtained at the edge of the glass sheets.

Suitable flexible elastic polyurethane coating with self-healing properties are described for example in European patent publication EP-A-190 517, in French patent publication FR-A-2 251 608 and in US-A-4 745 152.

What is claimed as new and is desired to be secured by letters patent of the United States is:

1. A bulletproof glass pane for a vehicle comprising:
   a glass pane comprising a plurality of silicate glass sheets with intervening layers of thermoplastic polymer;
   an impact-resistant plastic sheet or plate bonded by a thermoplastic adhesive film onto a surface of said glass pane, wherein a scratch-resistant coating is provided on a surface of said impact-resistant plastic sheet or plate opposite said glass pane; and
   a silicate glass sheet with a thermal radiation-reflecting coating, wherein said silicate glass sheet is on said glass pane, opposite said impact-resistant plastic sheet or plate.

2. The bulletproof glass pane according to claim 1, wherein said silicate glass sheet with said thermal radiation-reflecting film is disposed on the outermost silicate glass sheets of said glass pane and is bonded thereto by a thermoplastic intermediate layer.

3. The bulletproof glass pane according to claim 1, wherein said silicate glass sheet with said thermal radiation-reflecting film is disposed on a second glass pane which is connected to the first glass pane, on the outer side with an air gap between them, by a spacer frame.

4. The bulletproof glass pane according to claim 3, wherein said second glass pane is a thermally toughened monolithic safety glass pane and wherein said silicate glass sheet with said thermal radiation-reflecting film is disposed on the surface of said second glass pane which faces towards the air gap.

5. The bulletproof glass pane according to claim 3, wherein said second glass pane is a laminated glass pane, comprising two glass sheets and a thermoplastic intermediate film, wherein one of said glass sheets is said silicate glass sheet with said thermal radiation-reflecting film such that said thermal radiation-reflecting film bears against said thermoplastic intermediate film.

6. The bulletproof glass pane according to claim 1, wherein said thermal radiation-reflecting film is a multiple film having the construction: metal oxide-silver-metal oxide.

7. The bulletproof glass pane according to claim 1, wherein said thermal radiation-reflecting film terminates in the edge region at a distance from the edge of the pane, and that the bonding of the coated glass sheet to the adjacent glass sheet is assured by the adhesive intermediate film or by the adhesive sealing material of the spacer frame at the edge adjacent to the thermal radiation-reflecting film.

8. The bulletproof glass pane according to claim 1, wherein said impact-resistant plastic sheet or plate is polycarbonate, which is coated, on its free surface, with a soft-elastic scratch-resistant coating of a polyurethane having self-healing properties.

9. The bulletproof glass pane according to claim 1, wherein said silicate glass sheets of said glass pane have a thickness of at least 7 mm.

10. The bulletproof glass pane according to claim 1, wherein said silicate glass sheets of said glass pane have a thickness of 7–8 mm.

\* \* \* \* \*